(12) United States Patent
Payne

(10) Patent No.: US 9,368,844 B2
(45) Date of Patent: Jun. 14, 2016

(54) BATTERY SYSTEMS, BATTERY MODULES, AND METHOD FOR COOLING A BATTERY MODULE

(71) Applicant: LG Chem, Ltd., Seoul (KR)

(72) Inventor: Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 45 days.

(21) Appl. No.: 14/477,915

(22) Filed: Sep. 5, 2014

(65) Prior Publication Data

US 2014/0374055 A1  Dec. 25, 2014

Related U.S. Application Data

(62) Division of application No. 12/433,397, filed on Apr. 30, 2009, now Pat. No. 8,852,778.

(51) Int. Cl.
| | |
|---|---|
| *H01M 10/50* | (2006.01) |
| *H01M 10/6555* | (2014.01) |
| *H01M 10/04* | (2006.01) |
| *H01M 10/48* | (2006.01) |
| *H01M 10/613* | (2014.01) |

(Continued)

(52) U.S. Cl.
CPC ........... *H01M 10/5055* (2013.01); *F28F 27/00* (2013.01); *H01M 10/0413* (2013.01); *H01M 10/486* (2013.01); *H01M 10/502* (2013.01); *H01M 10/5004* (2013.01); *H01M 10/5057* (2013.01); *H01M 10/5061* (2013.01); *H01M 10/5095* (2013.01); *H01M 10/613* (2015.04); *H01M 10/63* (2015.04); *H01M 10/656* (2015.04); *H01M 10/6555* (2015.04); *H01M 10/6556* (2015.04); *H01M 10/663* (2015.04); *H01M 2/1072* (2013.01); *H01M 10/5022* (2013.01); *H01M 10/5032* (2013.01); *H01M 10/5075* (2013.01); *H01M 10/5077* (2013.01); *H01M 10/5079* (2013.01); *H01M 10/633* (2015.04); *H01M 10/647* (2015.04); *H01M 10/6567* (2015.04); *H01M 10/6568* (2015.04); *H01M 10/6569* (2015.04); *Y02E 60/12* (2013.01)

(58) Field of Classification Search
None
See application file for complete search history.

(56) References Cited

U.S. PATENT DOCUMENTS

| | | | |
|---|---|---|---|
| 5,756,227 A | 5/1998 | Suzuki et al. | |
| 6,176,095 B1 * | 1/2001 | Porter | B60H 1/3225 62/126 |

(Continued)

FOREIGN PATENT DOCUMENTS

| | | |
|---|---|---|
| CN | 001347162 | 5/2002 |
| JP | 1996148187 | 7/1996 |

(Continued)

*Primary Examiner* — Scott J Chmielecki
(74) *Attorney, Agent, or Firm* — Buckert Patent & Trademark Law Firm, PC; John F. Buckert

(57) ABSTRACT

Battery systems, battery modules, and a method for cooling a battery module are provided. The battery module includes a battery cell having a first side and a second side, and a first graphite sheet disposed on the first side of the battery cell that conducts heat energy from the battery cell into the first graphite sheet to cool the battery cell. The battery module further includes a first cooling manifold coupled to the first graphite sheet that conducts heat energy from the first graphite sheet into the first cooling manifold. The first cooling manifold is further configured to receive a fluid that flows therethrough to conduct heat energy from the first cooling manifold into the fluid.

12 Claims, 12 Drawing Sheets

(51) Int. Cl.
  *H01M 10/6556* (2014.01)
  *H01M 10/663* (2014.01)
  *F28F 27/00* (2006.01)
  *H01M 10/63* (2014.01)
  *H01M 10/656* (2014.01)
  *H01M 2/10* (2006.01)
  *H01M 10/633* (2014.01)
  *H01M 10/647* (2014.01)
  *H01M 10/6567* (2014.01)
  *H01M 10/6568* (2014.01)
  *H01M 10/6569* (2014.01)

(56) References Cited

U.S. PATENT DOCUMENTS

| | | | | |
|---|---|---|---|---|
| 6,475,659 | B1 * | 11/2002 | Heimer | H01M 2/0262 |
| | | | | 429/130 |
| 6,696,197 | B2 * | 2/2004 | Inagaki | H01M 2/0212 |
| | | | | 361/679.54 |
| 2002/0061436 | A1 | 5/2002 | Inagaki et al. | |
| 2004/0134646 | A1 * | 7/2004 | Chu | F28F 3/02 |
| | | | | 165/185 |
| 2005/0089750 | A1 * | 4/2005 | Ng | H01M 2/0242 |
| | | | | 429/120 |
| 2006/0134514 | A1 | 6/2006 | Lenain et al. | |
| 2007/0141453 | A1 * | 6/2007 | Mahalingam | H01M 10/42 |
| | | | | 429/120 |
| 2008/0003491 | A1 * | 1/2008 | Yahnker | B25F 5/008 |
| | | | | 429/62 |

FOREIGN PATENT DOCUMENTS

| | | |
|---|---|---|
| JP | 2002110122 | 1/2002 |
| JP | 2002038033 | 6/2002 |
| JP | 2003188323 | 4/2003 |
| JP | 2009170687 | 1/2008 |
| JP | 2009009889 | 1/2009 |
| KR | 20050092605 | 9/2005 |

* cited by examiner

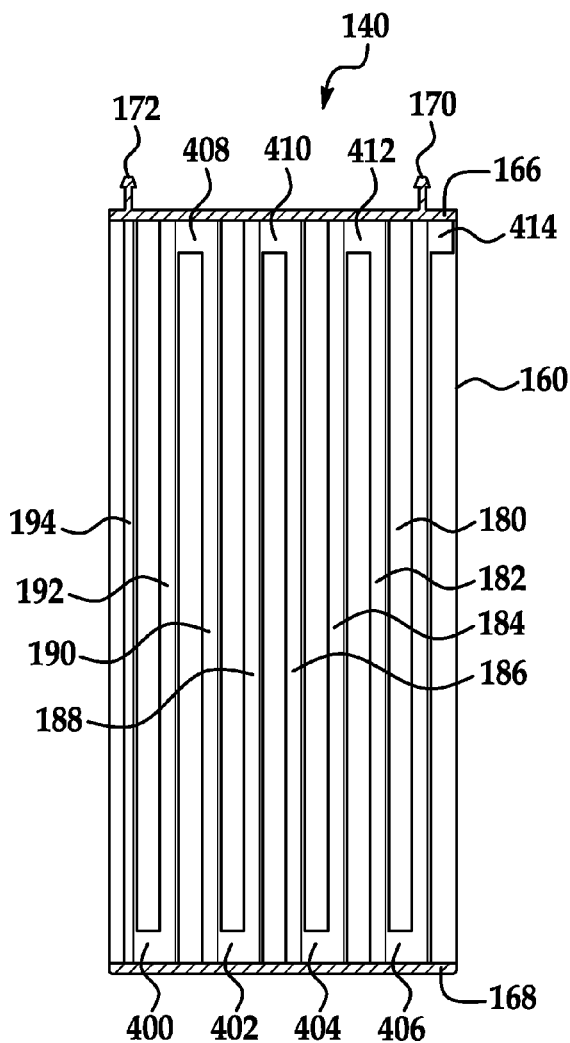
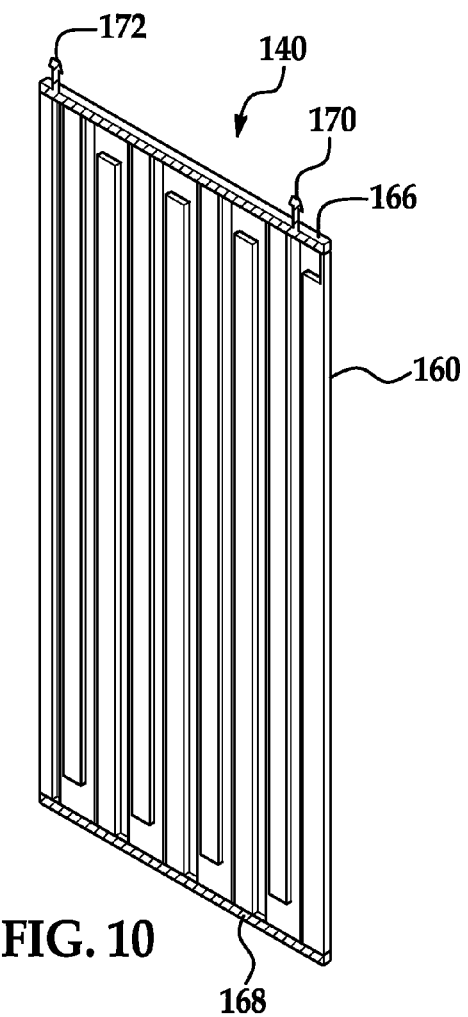
FIG. 9
FIG. 10

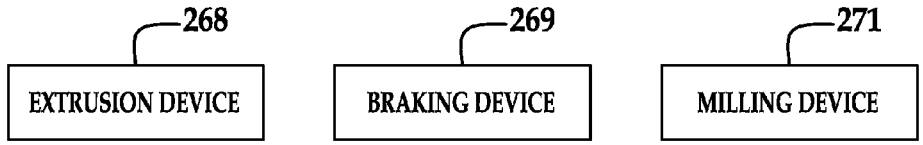

```
   ┌─268                  ┌─269                 ┌─271
EXTRUSION DEVICE      BRAKING DEVICE         MILLING DEVICE
```

FIG. 13

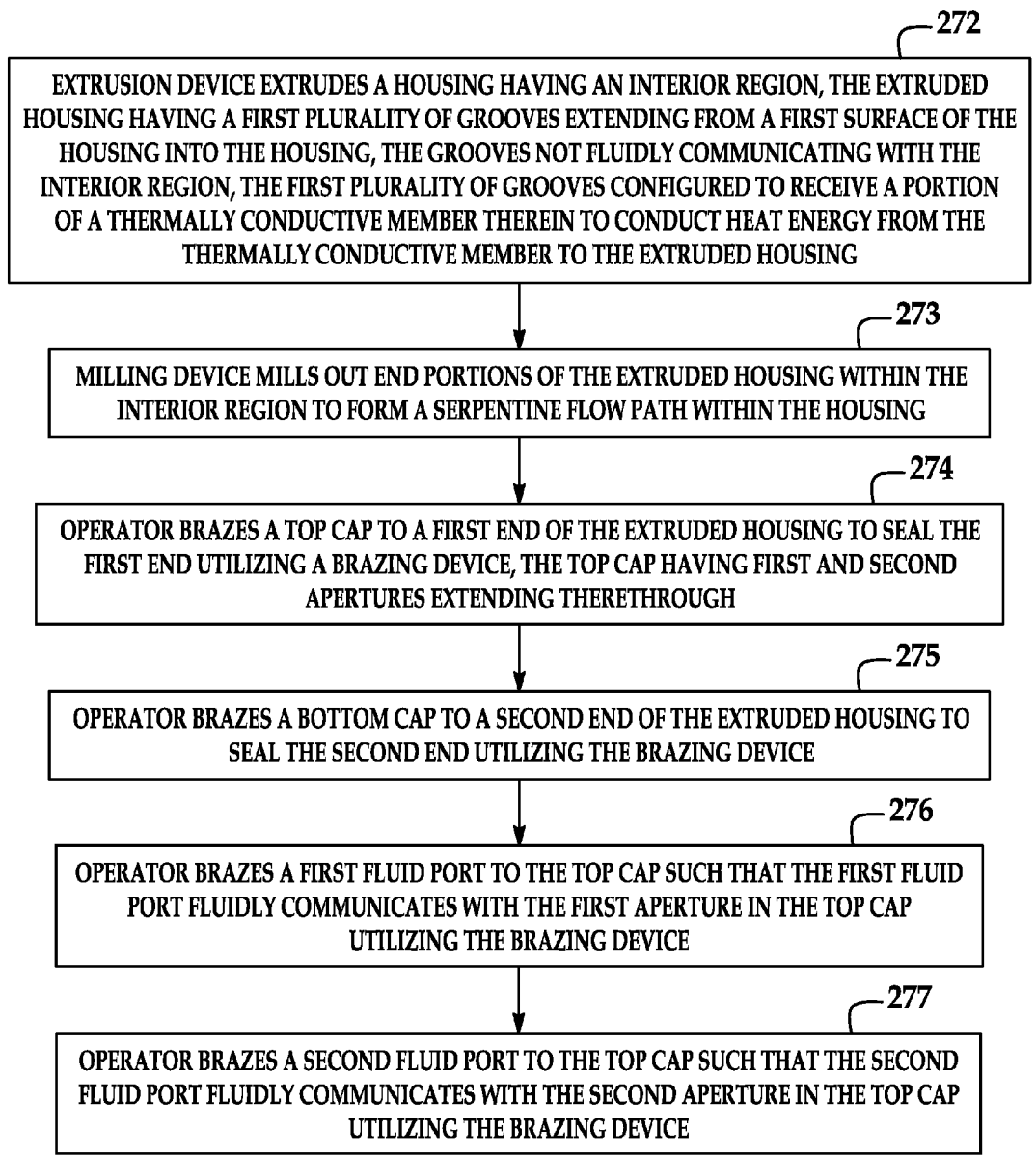

```
┌─272
EXTRUSION DEVICE EXTRUDES A HOUSING HAVING AN INTERIOR REGION, THE EXTRUDED
HOUSING HAVING A FIRST PLURALITY OF GROOVES EXTENDING FROM A FIRST SURFACE OF THE
HOUSING INTO THE HOUSING, THE GROOVES NOT FLUIDLY COMMUNICATING WITH THE
INTERIOR REGION, THE FIRST PLURALITY OF GROOVES CONFIGURED TO RECEIVE A PORTION
OF A THERMALLY CONDUCTIVE MEMBER THEREIN TO CONDUCT HEAT ENERGY FROM THE
THERMALLY CONDUCTIVE MEMBER TO THE EXTRUDED HOUSING

┌─273
MILLING DEVICE MILLS OUT END PORTIONS OF THE EXTRUDED HOUSING WITHIN THE
INTERIOR REGION TO FORM A SERPENTINE FLOW PATH WITHIN THE HOUSING

┌─274
OPERATOR BRAZES A TOP CAP TO A FIRST END OF THE EXTRUDED HOUSING TO SEAL THE
FIRST END UTILIZING A BRAZING DEVICE, THE TOP CAP HAVING FIRST AND SECOND
APERTURES EXTENDING THERETHROUGH

┌─275
OPERATOR BRAZES A BOTTOM CAP TO A SECOND END OF THE EXTRUDED HOUSING TO
SEAL THE SECOND END UTILIZING THE BRAZING DEVICE

┌─276
OPERATOR BRAZES A FIRST FLUID PORT TO THE TOP CAP SUCH THAT THE FIRST FLUID
PORT FLUIDLY COMMUNICATES WITH THE FIRST APERTURE IN THE TOP CAP
UTILIZING THE BRAZING DEVICE

┌─277
OPERATOR BRAZES A SECOND FLUID PORT TO THE TOP CAP SUCH THAT THE SECOND
FLUID PORT FLUIDLY COMMUNICATES WITH THE SECOND APERTURE IN THE TOP CAP
UTILIZING THE BRAZING DEVICE
```

FIG. 14

BATTERY SYSTEMS, BATTERY MODULES, AND METHOD FOR COOLING A BATTERY MODULE

CROSS-REFERENCE TO RELATED APPLICATIONS

This application is a divisional of U.S. patent application Ser. No. 12/433,397 filed on Apr. 30, 2009, the entire contents of which are hereby incorporated by reference herein.

TECHNICAL FIELD

This application relates to battery systems, battery modules, and a method for cooling the battery module.

BACKGROUND OF THE INVENTION

In a typical air-cooled battery pack, ambient air from ambient atmosphere is directed across battery cells in the battery pack and is subsequently exhausted from the battery pack. However, the typical air-cooled battery pack has a major challenge in maintaining a temperature of the battery pack within a desired temperature range.

In particular, a maximum operating temperature of the battery cells can often be less than a temperature of ambient air utilized to cool the batteries. In this situation, it is impossible to maintain the battery cells within a desired temperature range in an air-cooled battery pack.

Accordingly, the inventors herein have recognized a need for an improved battery system having a battery module and method for cooling the battery module that minimizes and/or eliminates the above-mentioned deficiency.

SUMMARY OF THE INVENTION

A battery module in accordance with an exemplary embodiment is provided. The battery module includes a battery cell having a first side and a second side. The battery module further includes a first graphite sheet disposed on the first side of the battery cell that conducts heat energy from the battery cell into the first graphite sheet to cool the battery cell. The battery module further includes a first cooling manifold coupled to the first graphite sheet that conducts heat energy from the first graphite sheet into the first cooling manifold. The first cooling manifold is further configured to receive a fluid that flows therethrough to conduct heat energy from the first cooling manifold into the fluid.

A battery system in accordance with another exemplary embodiment is provided. The battery system includes a battery module having a battery cell, a first graphite sheet, and a first cooling manifold. The battery cell has a first side and a second side. The first graphite sheet is disposed on the first side of the battery cell and conducts heat energy from the battery cell into the first graphite sheet to cool the battery cell. The first cooling manifold is coupled to the first graphite sheet and conducts heat energy from the first graphite sheet into the first cooling manifold. The first cooling manifold is further configured to receive a refrigerant that flows therethrough to conduct heat energy from the first cooling manifold into the refrigerant. The battery system includes a condenser fluidly coupled to the battery module. The condenser is configured to receive the refrigerant from the battery module and to extract heat energy from the refrigerant. The condenser is further fluidly coupled to a compressor and configured to route the refrigerant to the compressor. The compressor is further fluidly coupled to the first cooling manifold of the battery module. The compressor is configured to pump the refrigerant into the first cooling manifold.

A battery system in accordance with another exemplary embodiment is provided. The battery system includes a battery module having a battery cell, a first graphite sheet, and a first cooling manifold. The battery cell has a first side and a second side. The first graphite sheet is disposed on the first side of the battery cell and conducts heat energy from the battery cell into the first graphite sheet to cool the battery cell. The first cooling manifold is coupled to the first graphite sheet and conducts heat energy from the first graphite sheet into the first cooling manifold. The first cooling manifold is further configured to receive a coolant therethrough to conduct heat energy from the first cooling manifold into the coolant. The battery system further includes a heat exchanger fluidly coupled to the battery module. The heat exchanger is configured to receive the coolant from the battery module therein and to extract heat energy from the coolant flowing therethrough. The battery system further includes a cold plate fluidly coupled to the heat exchanger. The cold plate is configured to extract heat energy from the coolant flowing therethrough. The battery system further includes a reservoir fluidly coupled between the cold plate and a pump. The reservoir is configured to receive the coolant from the cold plate and to route the coolant to the pump. The pump is further fluidly coupled to the first cooling manifold of the battery module. The pump is configured to pump the coolant from the reservoir into the first cooling manifold.

A method for cooling a battery module in accordance with another exemplary embodiment is provided. The battery module has a battery cell, a first graphite sheet, and a first cooling manifold. The method includes conducting heat energy from the battery cell into the first graphite sheet disposed on a first side of the battery cell to cool the battery cell. The method further includes conducting heat energy from the first graphite sheet into the first cooling manifold coupled to the first graphite sheet. The method further includes receiving a fluid in the first cooling manifold and conducting heat energy from the first cooling manifold into the fluid in the first cooling manifold.

BRIEF DESCRIPTION OF THE DRAWINGS

FIG. 9 is a cross-sectional schematic of the cooling manifold of FIG. 8;

FIG. 10 is another cross-sectional schematic of the cooling manifold of FIG. 8;

FIG. 13 is a schematic of an extrusion device and a brazing device utilized to construct the cooling manifold of FIG. 8;

FIG. 14 is a flowchart of a method for constructing the cooling manifold of FIG. 8 in accordance with another exemplary embodiment;

DETAILED DESCRIPTION OF EXEMPLARY EMBODIMENTS

Figure 1:
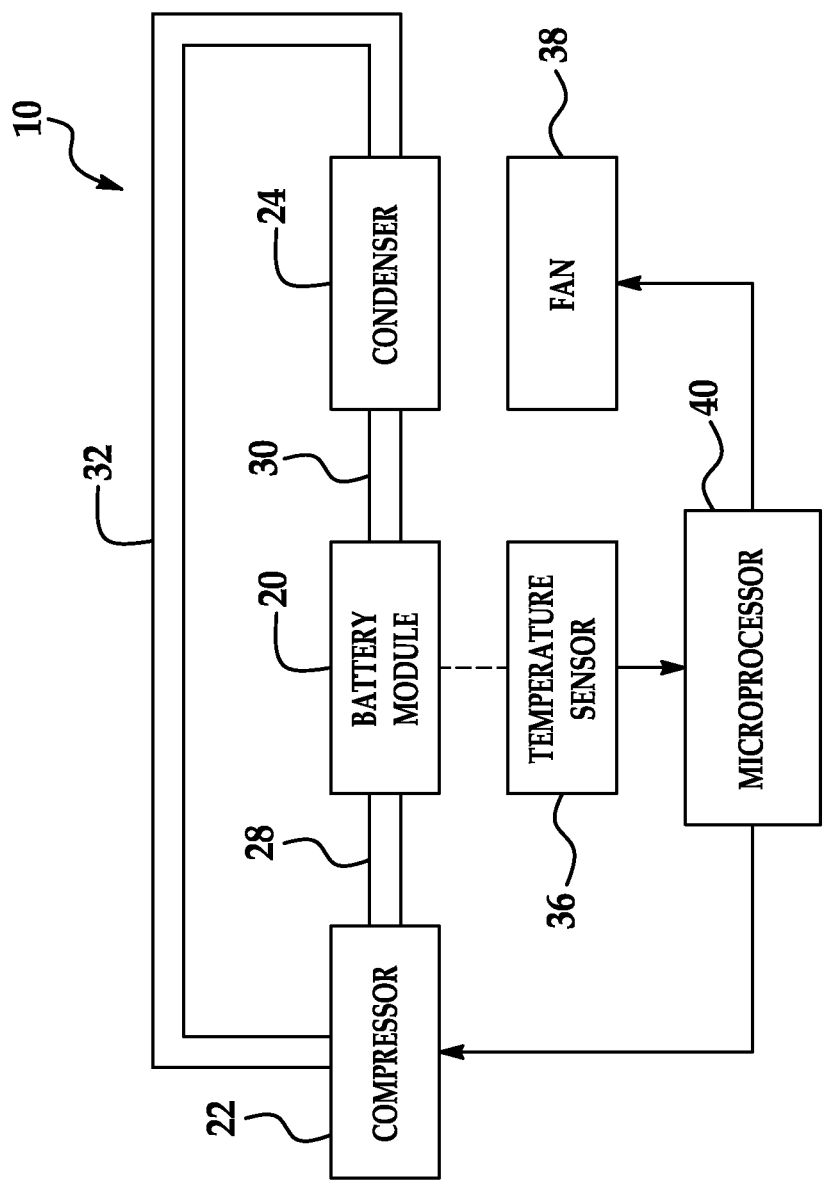
FIG. 1 is a schematic of a battery system in accordance with an exemplary embodiment.

Referring to FIG. 1, a battery system 10 for generating electrical power in accordance with an exemplary embodiment is illustrated. The battery system 10 includes a battery module 20, a compressor 22, a condenser 24, conduits 28, 30, 32, a temperature sensor 36, a fan 38, and a microprocessor 40. An advantage of the battery module 20 is that the battery module utilizes graphite sheets and cooling manifolds conduct heat energy from battery cells in the battery module 20 to effectively cool the battery cells.

For purposes of understanding, the term "fluid" means either a liquid or a gas. For example, a fluid can comprise either a coolant or a refrigerant. Exemplary coolants include ethylene glycol and propylene glycol. Exemplary refrigerants include R-11, R-12, R-22, R-134A, R-407C and R-410A.

Figure 2:
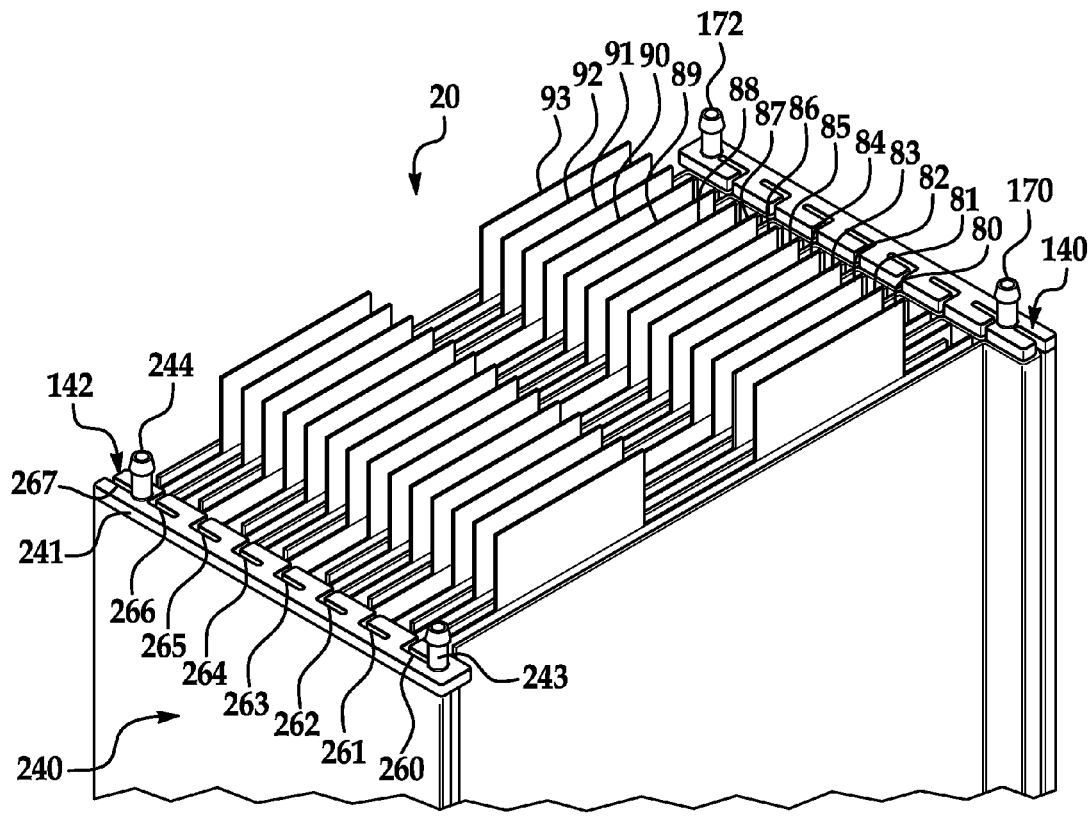
FIG. 2 is a schematic of a battery module utilized in the battery system of FIG. 1 in accordance with another exemplary embodiment.
Figure 3:
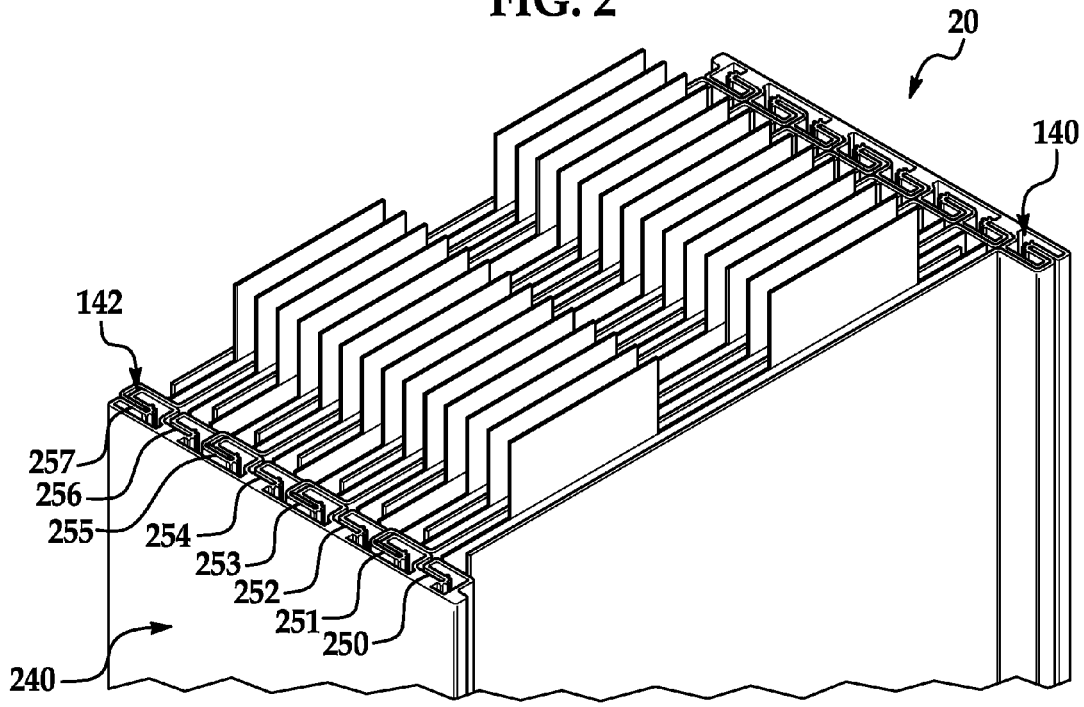
FIG. 3 is another schematic of the battery module of FIG. 2 having first and second top caps removed from first and second cooling manifolds, respectively, in the battery module.
Figure 4:
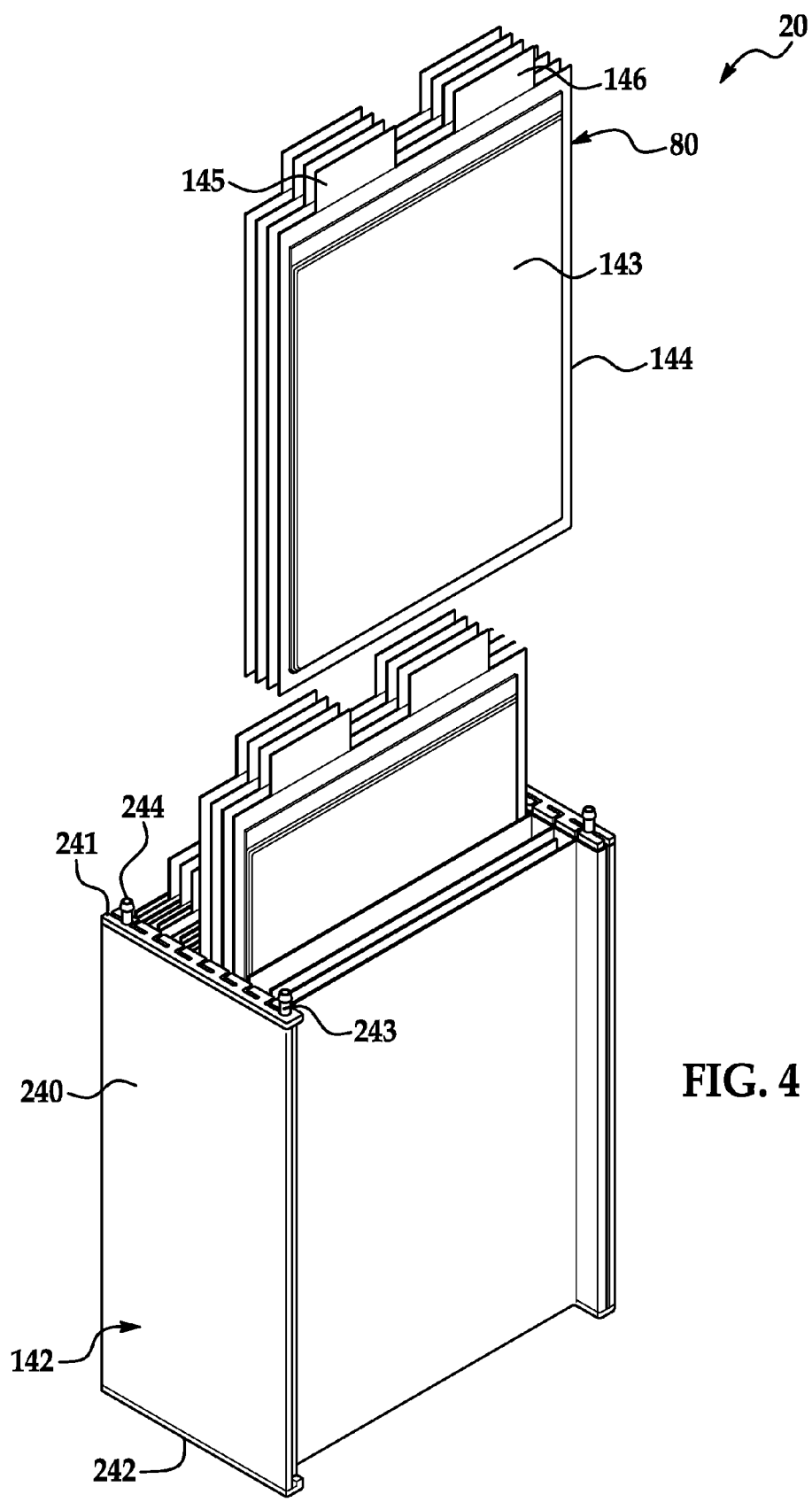
FIG. 4 is another schematic of the battery module of FIG. 2.

Referring to FIGS. 2-4, the battery module 20 is provided to generate a voltage therein in accordance with another exemplary embodiment. The battery module 20 includes battery cells 80, 81, 82, 83, 84, 85, 86, 87, 88, 89, 90, 91, 92, 93, graphite sheets 102, 104, 106, 108, 110, 112, 114, 116, 118, 120, 122, 124, and cooling manifolds 140, 142.

The battery cells 80, 81, 82, 83, 84, 85, 86, 87, 88, 89, 90, 91, 92, 93 are each provided to generate an operational voltage. Further, since each battery cell may have an identical structure, only the structure of the battery cell 80 will be described in further detail. As shown, the battery cell 80 includes a body portion 143, a peripheral extension portion 144, and electrodes 145, 146. The body portion 143 is generally rectangular-shaped and has the peripheral extension portion 144 extending around a periphery of the body portion 143. In an exemplary embodiment, the electrodes 145, 146 extend from a top portion of the battery cell 80 and have an operational voltage generated therebetween. In one exemplary embodiment, each battery cell is a lithium-ion battery cell. In alternative embodiments, the battery cells could be nickel-cadmium battery cells or nickel metal hydride battery cells for example. Of course, other types of battery cells known to those skilled in the art could be utilized.

Figure 5:
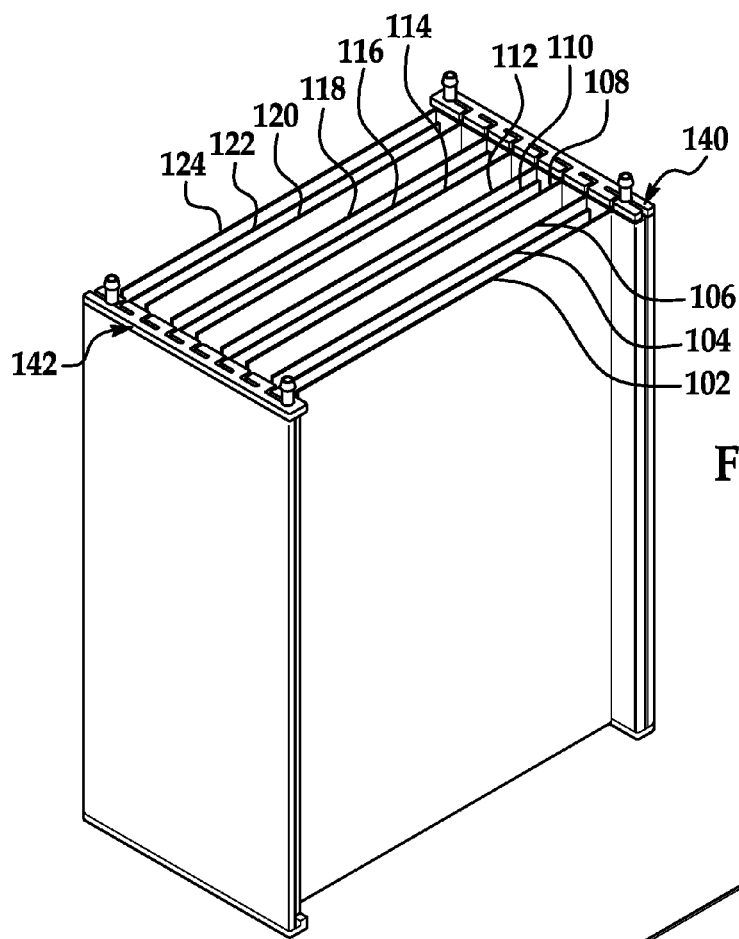
FIG. 5 is a schematic of graphite sheets and first and second cooling manifolds utilized in the battery module of FIG. 2.
Figure 6:
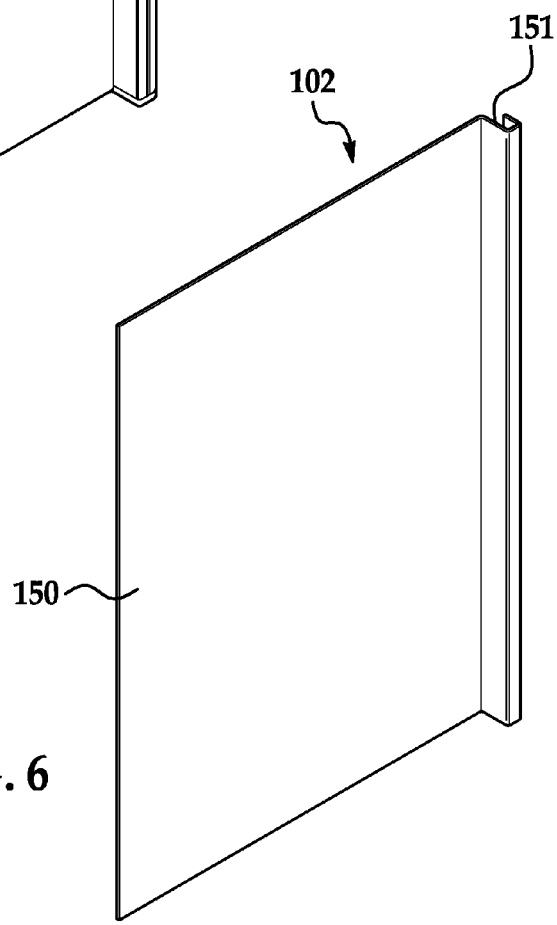
FIG. 6 is a schematic of a graphite sheet utilized in the battery module of FIG. 2.
Figure 7:
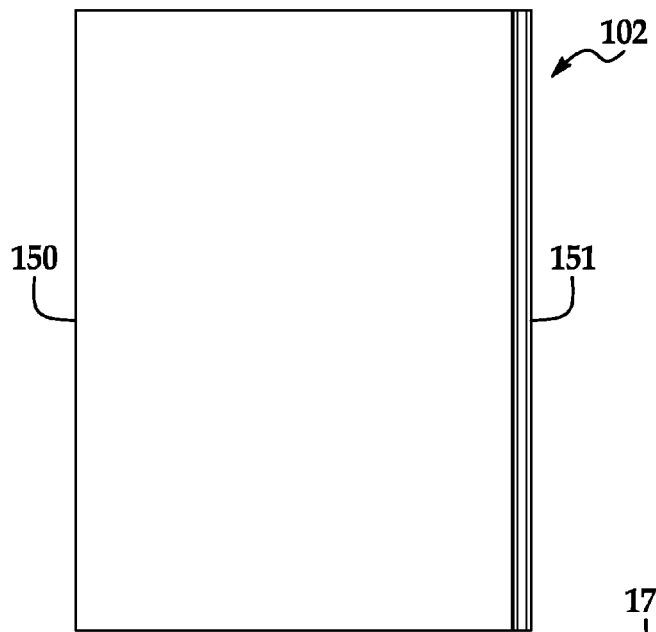
FIG. 7 is another schematic of the graphite sheet of FIG. 6.
Figure 8:
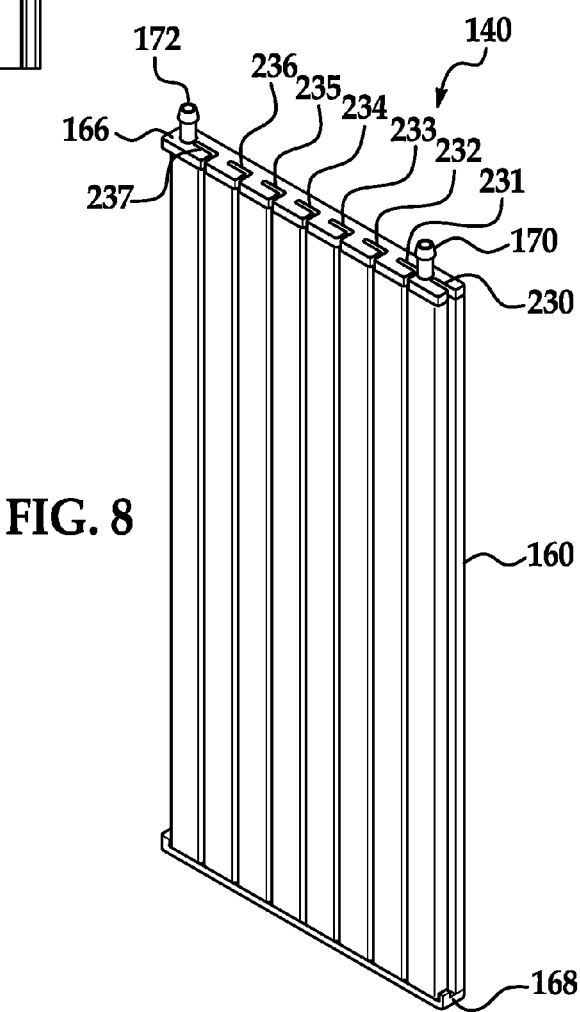
FIG. 8 is a schematic of a cooling manifold utilized in the battery module of FIG. 2 in accordance with another exemplary embodiment.
Figure 11:
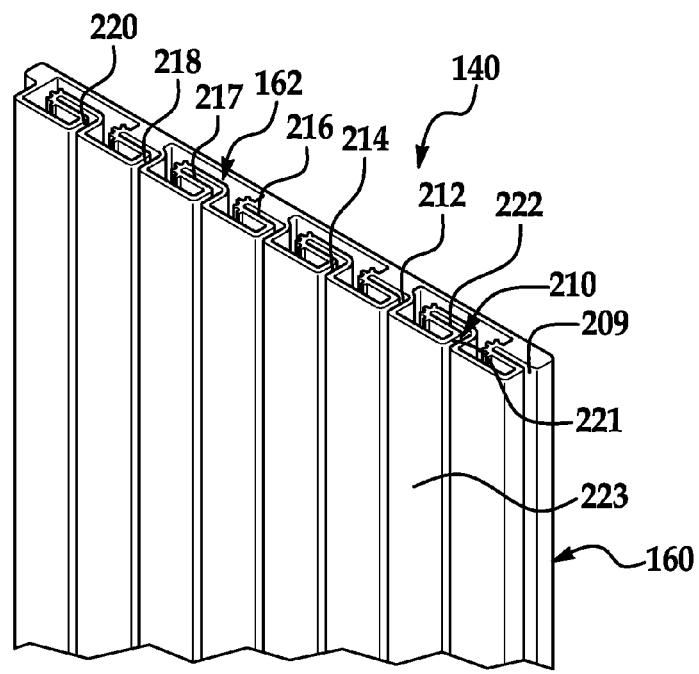
FIG. 11 is an enlarged schematic of the portion of the cooling manifold of FIG. 8.
Figure 12:
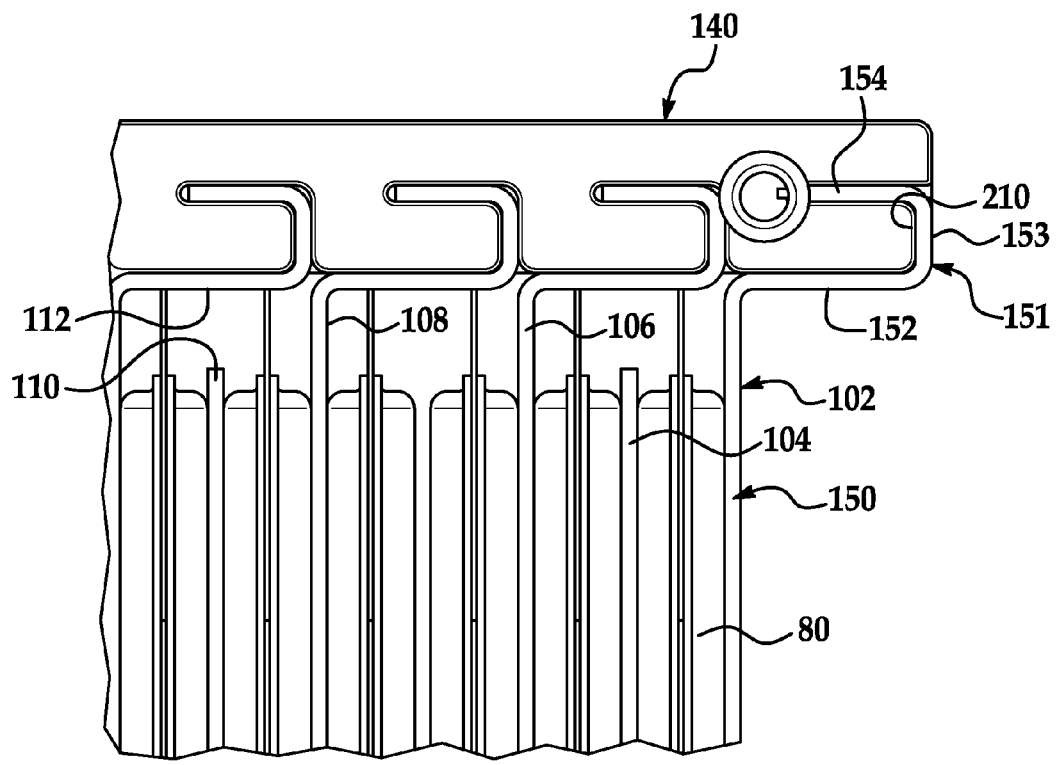
FIG. 12 is a schematic of a top portion of the battery module of FIG. 2 illustrating graphite sheets and a portion of the cooling manifold of FIG. 11.

Referring to FIGS. 2 and 5, the graphite sheets 102, 104, 106, 108, 110, 112, 114, 116, 118, 120, 122, 124 are provided to conduct heat energy from the battery cells 80, 81, 82, 83, 84, 85, 86, 87, 88, 89, 90, 91, 92, 93 into the cooling manifolds 140, 142 to cool the battery cells. In particular, the graphite sheets and cooling manifolds can maintain the battery cells within a desired temperature range, and in particular can maintain the battery cells at a temperature less than a threshold temperature level. In one exemplary embodiment, the desired temperature range is 15° Celsius –35° Celsius. In another exemplary embodiment, the threshold temperature level is 40° Celsius.

Referring to FIGS. 5-7 and 12, the graphite sheets 102, 104, 106, 108, 110, 112, 114, 116, 118, 120, 122, 124 have an identical structure. Accordingly, only the structure of the graphite sheet 102 will be described in greater detail below. As shown, the graphite sheet 102 includes a flat panel portion 150, and an extension portion 151 extending from the flat panel portion 150. The extension portion 151 includes portions 152, 153, 154. The portion 152 extends from the flat-panel portion 150 (rightwardly in FIG. 12). Further, the portion 153 extends from the portion 152 in a perpendicular direction (upwardly in FIG. 12) with respect to the portion 153, and substantially parallel to the flat panel portion 150. Further, the portion 154 extends from the portion 153 in a perpendicular direction (leftwardly in FIG. 12), and substantially parallel to the portion 152. As shown, the graphite sheet 102 is coupled to the cooling manifold 140 by inserting the portions 153, 154 in the groove 210 of the cooling manifold 140. Further, the u-shaped configuration of the extension portion 151 contacts a relatively large surface area of the cooling manifold 140 to effectively conduct heat energy from the battery cell 80 to the cooling manifold 140. In particular, each of the graphite sheets 102, 104, 106, 108, 112, 114, 118, 120, 124 have an extension portion that is received within a corresponding groove of the cooling manifold 140. Further, each of the graphite sheets 104, 110, 116, 122 have an extension portion that is received within a corresponding groove of the cooling manifold 142. In an exemplary embodiment, the graphite sheets have a polyethylene coating thereon to prevent electrical conductivity through the graphite sheets. Further, in an exemplary embodiment, each of the graphite sheets has a thickness in a range of 0.5 mm to 2.0 mm. Of course, in alternative embodiments, the graphite sheets could have a thickness greater than 2.0 mm or less than 0.5 mm.

Referring to FIGS. 8-12, the cooling manifold 140 is provided to conduct heat energy from the graphite sheets into a refrigerant flowing through the cooling manifold 140. The cooling manifold 140 includes an extruded housing 160, a top cap 166, a bottom cap 168, and fluid ports 170, 172. The housing 160, the top cap 166, the bottom cap 168, and the fluid ports 170, 172 can be constructed from at least one of aluminum, copper, silver, gold, and alloys thereof. The extruded housing 160 defines an interior region 162 for receiving a refrigerant therein. The housing 160 defines a serpentine flow path therein from the fluid port 170 to the fluid port 172. The serpentine flow path includes the flow channels 180, 182, 184, 186, 188, 190, 192, 194 that fluidly communicate with one another. Further, the housing 160 defines grooves 209, 210, 212, 214, 216, 217, 218, 220 extending therein for receiving corresponding extension portions of graphite sheets therein. Since the grooves 210, 212, 214, 216, 217, 218, 220 have an identical shape, only the shape of groove 210 will be explained in greater detail. In particular, the groove 210 includes a groove portion 221 that extends into the housing 160 perpendicular to a surface 223 of the housing 160. Further, the groove 210 includes a groove portion 222 extends from an end of the groove portion 221 parallel to the surface 223. It should be noted that the groove 210 does not fluidly communicate with the interior region 162, nor to the other grooves of the housing 160.

It should be noted that in an alternative embodiment, the grooves in the housing 160 of the cooling manifold 140 could have a different configuration or shape than the illustrated grooves, depending on a type of member being coupled to the cooling manifold 140 and a desired thermal performance for conducting heat energy away from the member. Further, in another alternative embodiment, the housing 160 of the cooling manifold 140 could be constructed without any grooves and could merely contact a member or a fluid to conduct heat energy away from the member or the fluid.

The bottom cap 168 is fixedly coupled to a bottom surface of the housing 160 to seal a first end of the housing 160.

The top cap 166 is fixedly coupled to a top surface of the housing 160 to seal a second end of the housing 160. The fluid ports 170, 172 are disposed on the top cap 166 over first and second apertures, respectively, extending through the top cap 166 such that the fluid ports 170, 172 fluidly communicate with the first and second apertures, respectively. The top cap 166 further includes grooves 230, 231, 232, 233, 234, 235, 236, 237 extending therethrough that communicate with the grooves 209, 210, 212, 214, 216, 217, 218, 220, respectively in the housing 160 for receiving corresponding graphite sheets therein.

During operation, refrigerant flows through the fluid port 170 and into the interior region 162 of the housing 160 and then through the serpentine flow path defined therein and then out through the fluid port 172. The refrigerant extracts heat energy from the housing 160 to cool the housing 160 and the graphite sheets, that further cools the battery cells in the battery module 20.

Referring to FIGS. 2, 3 and 4, the cooling manifold 142 is provided to conduct heat energy from the graphite sheets into a refrigerant flowing through the cooling manifold 142. The cooling manifold 142 includes an extruded housing 240, a top cap 241, a bottom cap 242, and fluid ports 243, 244. The housing 240, the top cap 241, the bottom cap 242, and the fluid ports 243, 244 can be constructed from at least one of aluminum, copper, silver, gold, and alloys thereof. It should be noted that the structure of the cooling manifold 142 is identical to the cooling manifold 140 discussed above. The housing 240 defines grooves 250, 251, 252, 253, 254, 255, 256, 257 extending therein for receiving corresponding extension portions of graphite sheets therein.

The bottom cap 242 is fixedly coupled to a bottom surface of the extruded housing 240 to seal a first end of the housing 240.

The top cap 241 is fixedly coupled to a top surface of the housing 240. The fluid ports 243, 244 are disposed on the top cap 241 over first and second apertures, respectively, extending through the top cap 241 such that the fluid ports 243, 240 fluidly communicate with the first and second apertures, respectively. The top cap 241 further includes grooves 260, 261, 262, 263, 264, 265, 266, 267 extending therethrough that communicate with the grooves 250, 251, 252, 253, 254, 255, 256, 257, respectively in the housing 240.

During operation, refrigerant flows through the fluid port 243 and into the interior region of the housing 240 and then through the serpentine flow path defined therein and then through the fluid port 244. The refrigerant extracts heat energy from the housing 240 to cool the housing 240 and the graphite sheets coupled thereto, that further cools the battery cells.

Referring to FIGS. 9, 13 and 14, a flowchart of a method for manufacturing the cooling manifold 140 in accordance with another exemplary embodiment will now be explained.

At step 272, an extrusion device 268 extrudes a housing 160 having an interior region 162. The extruded housing 160 has a first plurality of grooves 210, 212, 214, 216, 218, 220 extending from a first surface of the extruded housing 160 into the housing 160. The grooves do not fluidly communicate with the interior region 162. Further, the first plurality of grooves are configured to receive a portion of a thermally conductive member (e.g., the graphite sheet 80) therein to conduct heat energy from the thermally conductive member to the extruded housing 160.

At step 273, a milling device 271 mills out end portions of the extruded housing 160 within the interior region 162 to form a serpentine flow path within the housing 160. For example, the milling device 271 mills out portions of a first end of the extruded housing 160 to form open regions 400, 402, 404, 406 therein. Further, the milling device 271 mills out portions of a second end of the extruded housing 160 to form open regions 408, 410, 412, 414 therein. The serpentine flow path within the housing 160 is defined by the open regions 400, 402, 404, 406, 408, 410, 412, 414 and the flow channels 180, 182, 184, 186, 188, 190, 192, 194.

At step 274, an operator brazes the top cap 166 to a first end of the extruded housing 160 to seal the first end utilizing a brazing device 269. The top cap 166 has first and second apertures extending therethrough.

At step 275, the operator brazes the bottom cap 168 to a second end of the extruded housing 160 to seal the second end utilizing the brazing device 269.

At step 276, the operator brazes a first fluid port 170 to the top cap 166 such that the first fluid port fluidly communicates with the first aperture in the top cap 166 utilizing the brazing device 269.

At step 277, the operator brazes a second fluid port 172 to the top cap 166 such that the second fluid port 172 fluidly communicates with the second aperture in the top cap 166 utilizing the brazing device 269.

Referring again to FIG. 1, the compressor 22 is configured to pump a refrigerant through the conduit 28 into the battery module 20 in response to a control signal from the microprocessor 40. As shown, the conduit 28 is fluidly coupled to the compressor 22 and the ports 170, 243 of the battery module 20. The conduit 30 is fluidly coupled to the ports 172, 244 of the battery module 20 and the condenser 24. After exiting the battery module 20, the refrigerant is further pumped through the conduit 30 to the condenser 24.

The condenser 24 is provided to extract heat energy from the refrigerant flowing therethrough to cool the refrigerant. As shown, a conduit 32 is fluidly coupled between the condenser 24 and the compressor 22. After exiting the condenser 24, the refrigerant is further pumped through the conduit 32 to the compressor 22.

The temperature sensor 36 is provided to generate a signal indicative of a temperature level of the battery module 20 that is received by the microprocessor 40.

The fan 38 is provided to urge air past the condenser 24 to cool the condenser 24 in response to a control signal from the microprocessor 40. As shown, the fan 38 is disposed proximate to the condenser 24. In an alternative embodiment, the condenser 24 is a liquid to refrigerant condenser.

The microprocessor 40 is provided to control operation of the battery system 10. In particular, the microprocessor 40 is configured to generate control signals for controlling operation of the compressor 22 and the fan 38, in response to a signal from the temperature sensor 36, as will be explained in greater detail below.

Figure 15:
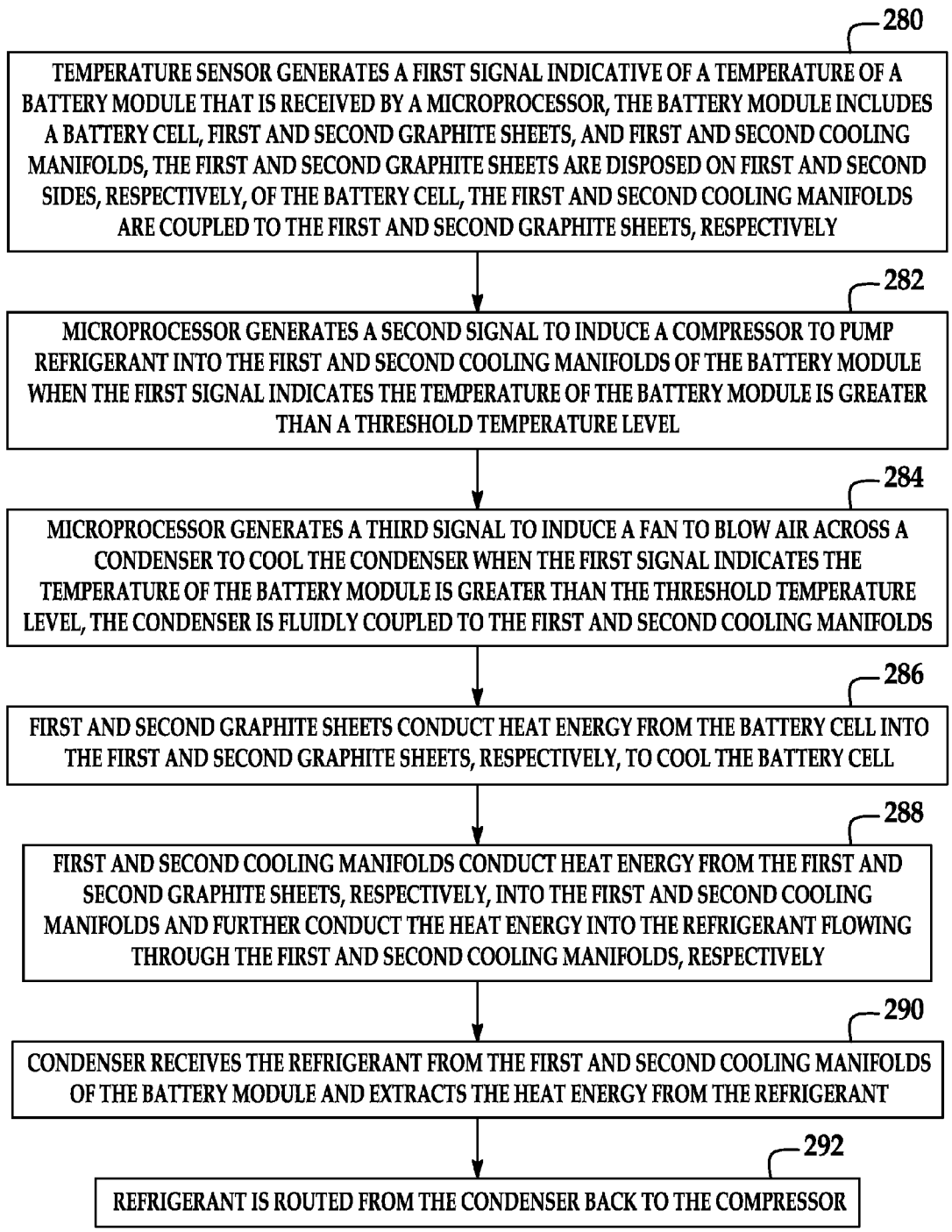
FIG. 15 is a flowchart of a method for cooling the battery module in the battery system of FIG. 1 in accordance with another exemplary embodiment.

Referring to FIG. 15, a flowchart of a method for cooling a battery module in accordance with another exemplary embodiment will now be explained. For purposes of simplicity, the method will be described utilizing a single battery cell and a pair of graphite sheets in a battery module. Of course, additional battery cells and graphite sheets could be utilized.

At step 280, the temperature sensor 36 generates a first signal indicative of a temperature of the battery module 20 that is received by the microprocessor 40. The battery module 20 includes the battery cell 80, graphite sheets 102, 104, and cooling manifolds 140, 142. The graphite sheets 102, 104 are disposed on first and second sides, respectively, of the battery cell 80. The cooling manifolds 140, 142 are coupled to the graphite sheets 102, 104, respectively.

At step 282, the microprocessor 40 generates a second signal to induce the compressor 22 to pump refrigerant into the cooling manifolds 140, 142 of the battery module 20 when the first signal indicates the temperature of the battery module 20 is greater than a threshold temperature level.

At step 284, the microprocessor 40 generates a third signal to induce the fan 38 to blow air across the condenser 24 to cool the condenser 24 when the first signal indicates the temperature of the battery module 20 is greater than the threshold temperature level. The condenser 24 is fluidly coupled to the cooling manifolds 140, 142.

At step 286, the graphite sheets 102, 104 conduct heat energy from the battery cell 80 into the graphite sheets 102, 104 to cool the battery cell 20.

At step 288, the cooling manifolds 140, 142 conduct heat energy from the graphite sheets 102, 104 into the cooling manifolds 140, 142 and further conduct the heat energy into the refrigerant flowing through the cooling manifolds 140, 142.

At step 290, the condenser 24 receives the refrigerant from the cooling manifolds 140, 142 of the battery module 20 and extracts the heat energy from the refrigerant.

At step 292, the refrigerant is routed from the condenser 24 back to the compressor 22.

Figure 16:
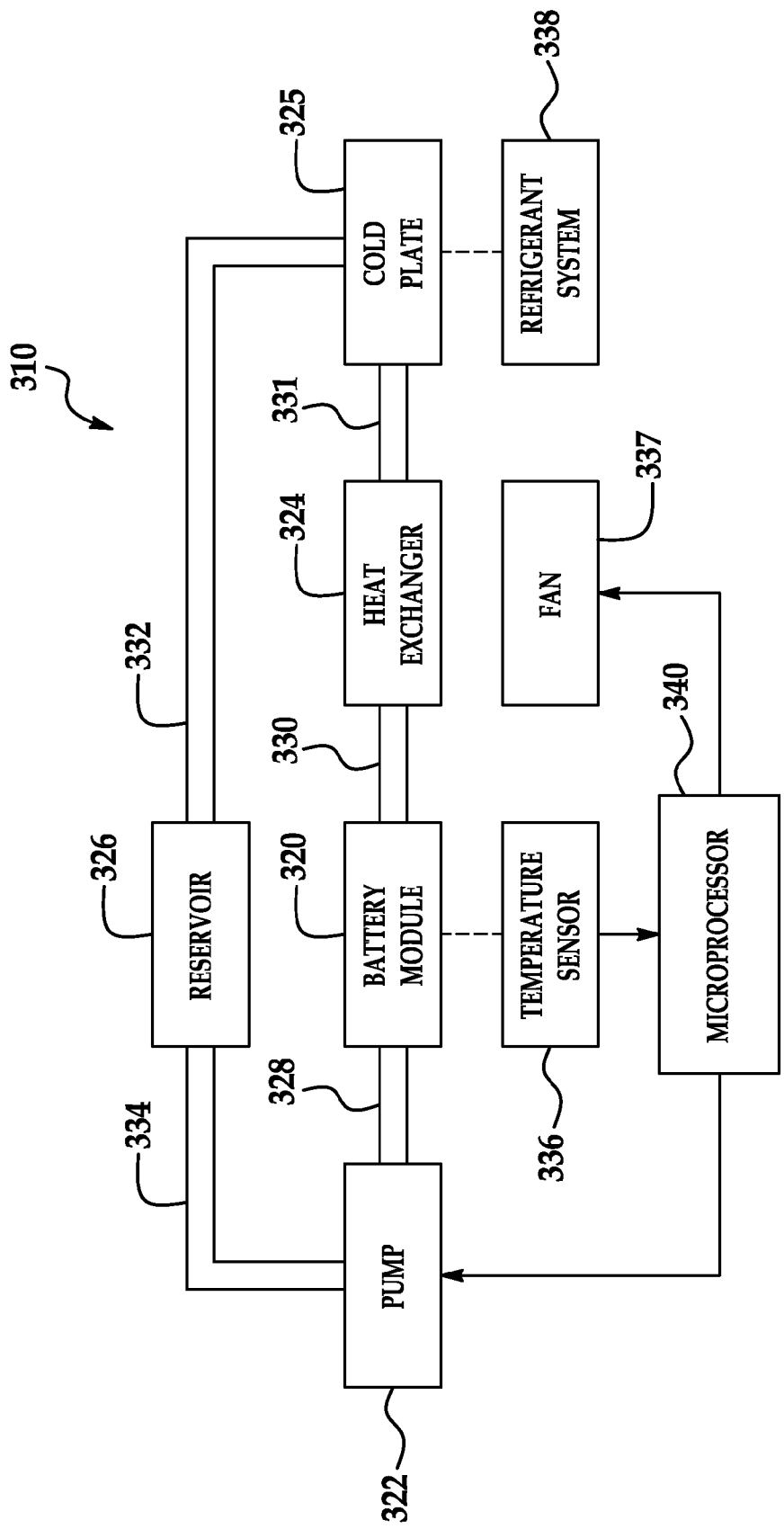
FIG. 16 is a schematic of a battery system in accordance with another exemplary embodiment.

Referring to FIG. 16, a battery system 310 for generating electrical power in accordance with another exemplary embodiment is illustrated. The battery system 310 includes a battery module 320, a pump 322, a heat exchanger 324, a cold plate 325, a reservoir 326, a fan 337, conduits 328, 330, 331, 332, 334, a temperature sensor 336, a refrigerant system 338, and a microprocessor 340. The primary difference between the battery system 310 and the battery system 10 is that the battery system 310 utilizes a coolant instead of a refrigerant to cool the battery module 320.

The battery module 320 has an identical structure as the battery module 20 discussed above.

The pump 322 is configured to pump a coolant through the conduit 328 into the battery module 320 in response to a control signal from the microprocessor 340. As shown, the conduit 328 is fluidly coupled between the pump 322 and the battery module 320, and the conduit 330 is fluidly coupled between the battery module 320 and the heat exchanger 324. After exiting the battery module 320, the coolant is further pumped through the conduit 330 to the heat exchanger 324.

The heat exchanger 324 is provided to extract heat energy from the coolant flowing therethrough to cool the coolant. As shown, a conduit 331 is fluidly coupled between the heat exchanger 324 and the cold plate 325. After exiting the heat exchanger 324, the coolant is further pumped through the conduit 331 to the cold plate 325.

The fan 337 is provided to urge air past the heat exchanger 324 to cool the heat exchanger 324 in response to a control signal from the microprocessor 340. As shown, the fan 337 is disposed proximate to the heat exchanger 324.

The cold plate 325 is provided to extract heat energy from the coolant flowing therethrough to further cool the coolant. As shown, a conduit 322 is fluidly coupled between the cold plate 325 and the reservoir 326. After exiting the cold plate 325, the coolant is further pumped through the conduit 332 to the reservoir 326.

The reservoir 326 is provided to store at least a portion of the coolant therein. As shown, a conduit 334 is fluidly coupled between the reservoir 326 and the pump 322. After exiting the reservoir 326, the coolant is further pumped through the conduit 334 to the pump 322.

The temperature sensor 336 is provided to generate a signal indicative of a temperature level of the battery module 320 that is received by the microprocessor 340.

The refrigerant system 338 is provided to cool the heat exchanger 324 in response to a control signal from the microprocessor 340. As shown, the refrigerant system 338 is operably coupled to the cold plate 325.

The microprocessor 340 is provided to control operation of the battery system 310. In particular, the microprocessor 340 is configured to generate control signals for controlling operation of the pump 322, the fan 337, and the refrigerant system 338 in response to a signal from the temperature sensor 336, as will be explained in greater detail below.

Figure 17:
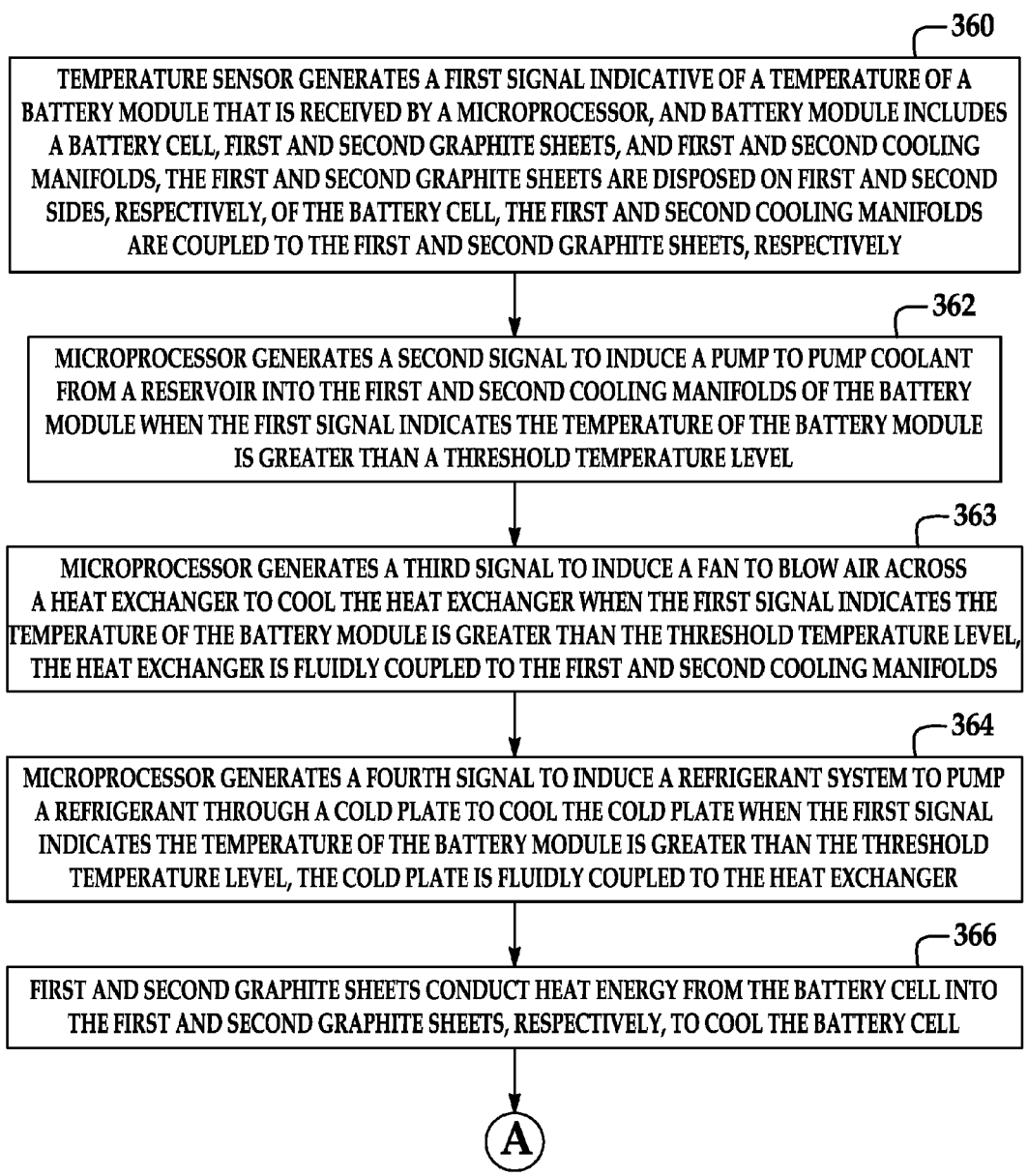
FIGS. 17-18 are flowcharts of a method for cooling a battery module in the battery system of FIG. 16 in accordance with another exemplary embodiment.
Figure 18:
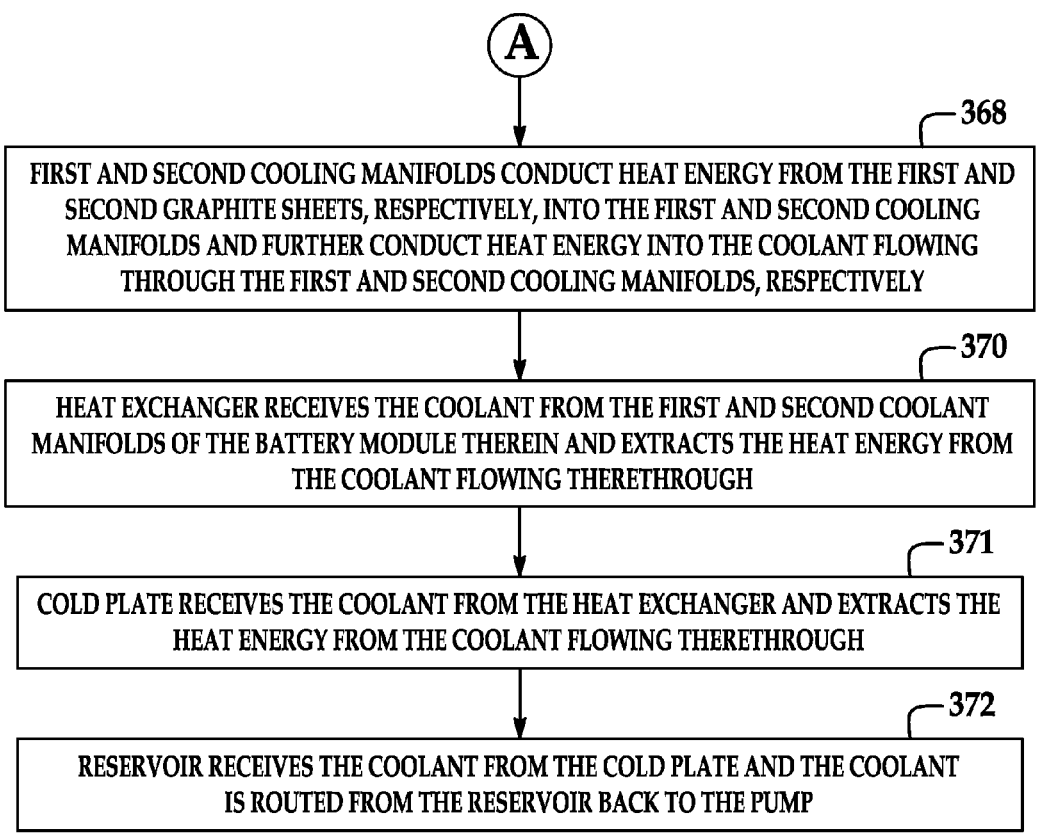

Referring to FIGS. 17-18, a flowchart of a method for cooling the battery module 320 in accordance with another exemplary embodiment is provided. For purposes of simplicity, the method will be described utilizing a single battery cell and a pair of graphite sheets in a battery module. Of course, additional battery cells and graphite sheets could be utilized.

At step 360, the temperature sensor 336 generates a first signal indicative of a temperature of the battery module 320 that is received by the microprocessor 340. The battery module 320 includes a battery cell, first and second graphite sheets, and first and second cooling manifolds. The first and second graphite sheets are disposed on first and second sides, respectively, of the battery cell. The first and second cooling manifolds are coupled to the first and second graphite sheets, respectively.

At step 362, the microprocessor 340 generates a second signal to induce the pump 322 to pump coolant from the reservoir 326 into the first and second cooling manifolds of the battery module 320 when the first signal indicates the temperature of the battery module 320 is greater than a threshold temperature level.

At step 363, the microprocessor 340 generates a third signal to induce the fan 337 to blow air across the heat exchanger 324 to cool the heat exchanger 324 when the first signal indicates the temperature of the battery module 320 is greater than the threshold temperature level. The heat exchanger 324 is fluidly coupled to first and second cooling manifolds of the battery module 320.

At step 364, the microprocessor 340 generates a fourth signal to induce the refrigerant system 338 to pump a refrigerant through a portion of the cold plate 325 to cool the cold plate 325 when the first signal indicates the temperature of the battery module 320 is greater than the threshold temperature level. The cold plate 325 is fluidly coupled to the heat exchanger 324.

At step 366, the first and second graphite sheets conduct heat energy from the battery cell into the first and second graphite sheets, respectively, to cool the battery cell.

At step 368, the first and second cooling manifolds conduct heat energy from the first and second graphite sheets, respectively, into the first and second cooling manifolds and further conduct the heat energy into the coolant flowing through the first and second cooling manifolds, respectively.

At step 370, the heat exchanger 324 receives the coolant from the first and second cooling manifolds of the battery module 320 therein and extracts the heat energy from the coolant flowing therethrough.

At step 371, the cold plate 325 receives the coolant from the heat exchanger 324 and extracts the heat energy from the coolant flowing therethrough.

At step 372, the reservoir 326 receives the coolant from the cold plate 325 and the coolant is routed from the reservoir 326 back to the pump.

The battery systems, battery modules, and the method for cooling the battery module provide a substantial advantage over other systems, modules, and methods. In particular, the battery systems, battery modules and method provide a technical effect of cooling a battery cell in the battery module utilizing a graphite sheet coupled to a cooling manifold that effectively removes heat energy from the battery cell, while maintaining a relatively thin profile of the battery module.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A method for cooling a battery module, comprising:
providing the battery module having a battery cell, a first graphite sheet, a first cooling manifold, a second graphite sheet, and a second cooling manifold; the battery cell having a generally rectangular-shaped body portion with a first side and a second side; the first graphite sheet having a first flat panel portion and a first extension portion, the first extension portion extending from a first end of the first flat panel portion; the first cooling manifold having a groove extending therein that receives the first extension portion therein, the first flat panel portion being disposed on the first side of the battery cell, the first flat panel portion of the first graphite sheet being disposed perpendicular to the first cooling manifold, the first side of the battery cell being disposed perpendicular to the first cooling manifold; the second graphite sheet having a second flat panel portion and a second extension portion, the second extension portion extending from a first end of the second flat panel portion; the second cooling manifold having a groove extending therein that receives the second extension portion therein, the second flat panel portion being disposed on the second side of the battery cell, the second flat panel portion being disposed perpendicular to the second cooling manifold, the first side of the battery cell being disposed perpendicular to the second cooling manifold;
conducting heat energy from the battery cell into the first flat panel portion of the first graphite sheet that is disposed on the first side of the battery cell to cool the battery cell;
conducting heat energy from the first graphite sheet into the first cooling manifold coupled to the first extension portion of the first graphite sheet;
receiving a first fluid in the first cooling manifold and conducting heat energy from the first cooling manifold into the first fluid in the first cooling manifold;
conducting heat energy from the battery cell into the second flat panel portion of the second graphite sheet that is disposed on the second side of the battery cell to cool the battery cell;
conducting heat energy from the second graphite sheet into the second cooling manifold coupled to the second extension portion of the second graphite sheet; and
receiving a second fluid in the second cooling manifold and conducting heat energy from the second cooling manifold into the second fluid in the second cooling manifold.

2. The method of claim 1, wherein the first fluid is a refrigerant.

3. The method of claim 2, further comprising:
generating a first signal indicative of a temperature of the battery module utilizing a temperature sensor; and
generating a second signal to induce a compressor to pump the refrigerant through the first cooling manifold when the first signal indicates the temperature of the battery module is greater than a threshold temperature level utilizing a microprocessor.

4. The method of claim 1, wherein the first fluid is a coolant.

5. The method of claim 4, further comprising:
generating a first signal indicative of a temperature of the battery module utilizing a temperature sensor; and
generating a second signal to induce a pump to pump the coolant through the first cooling manifold when the first signal indicates the temperature of the battery module is greater than a threshold temperature level utilizing a microprocessor.

6. The method of claim 1, further comprising disposing the battery cell and the first and second graphite sheets between the first and second cooling manifolds.

7. A method for cooling a battery module, comprising:
providing the battery module having a first battery cell, a first graphite sheet, a first cooling manifold, a second battery cell, a second graphite sheet, and a second cooling manifold; the first battery cell having a generally rectangular-shaped body portion with a first side and a second side; the first graphite sheet having a first flat panel portion and a first extension portion, the first extension portion extending from a first end of the first flat panel portion; the first cooling manifold having a groove extending therein that receives the first extension portion therein, the first flat panel portion being disposed on the first side of the first battery cell, the first flat panel portion of the first graphite sheet being disposed perpendicular to the first cooling manifold, the first side of the first battery cell being disposed perpendicular to the first cooling manifold; the second battery cell having a generally rectangular-shaped body portion with a first side and a second side; the second graphite sheet having a second flat panel portion and a second extension portion, the second extension portion extending from a first end of the second flat panel portion; the second cooling manifold having a groove extending therein that receives the second extension portion therein, the second flat panel portion being disposed on the first side of the second battery cell, the second flat panel portion being disposed perpendicular to the second cooling manifold, the first side of the second battery cell being disposed perpendicular to the second cooling manifold;
conducting heat energy from the first battery cell into the first flat panel portion of the first graphite sheet that is disposed on the first side of the first battery cell to cool the first battery cell;

conducting heat energy from the first graphite sheet into the first cooling manifold coupled to the first extension portion of the first graphite sheet;

receiving a first fluid in the first cooling manifold and conducting heat energy from the first cooling manifold into the first fluid in the first cooling manifold;

conducting heat energy from the second battery cell into the second flat panel portion of the second graphite sheet that is disposed on the first side of the second battery cell to cool the second battery cell;

conducting heat energy from the second graphite sheet into the second cooling manifold coupled to the second extension portion of the second graphite sheet; and receiving a second fluid in the second cooling manifold and conducting heat energy from the second cooling manifold into the second fluid in the second cooling manifold.

8. The method of claim 7, wherein the first fluid is a refrigerant.

9. The method of claim 8, further comprising:

generating a first signal indicative of a temperature of the battery module utilizing a temperature sensor; and generating a second signal to induce a compressor to pump the refrigerant through the first cooling manifold when the first signal indicates the temperature of the battery module is greater than a threshold temperature level utilizing a microprocessor.

10. The method of claim 7, wherein the first fluid is a coolant.

11. The method of claim 10, further comprising:

generating a first signal indicative of a temperature of the battery module utilizing a temperature sensor; and generating a second signal to induce a pump to pump the coolant through the first cooling manifold when the first signal indicates the temperature of the battery module is greater than a threshold temperature level utilizing a microprocessor.

12. The method of claim 7, further comprising disposing the first and second battery cells and the first and second graphite sheets between the first and second cooling manifolds.

* * * * *